United States Patent
Kaim

[11] Patent Number: 5,941,549
[45] Date of Patent: Aug. 24, 1999

[54] FIFTH WHEEL KINGPIN DEFLECTOR AND CATCHER

[75] Inventor: John W. Kaim, Chicago, Ill.

[73] Assignee: Amsted Industries Incorporated, Chicago, Ill.

[21] Appl. No.: 08/818,571

[22] Filed: Mar. 14, 1997

[51] Int. Cl.⁶ .................................................. B62D 53/08
[52] U.S. Cl. .......................... 280/433; 280/432; 280/437
[58] Field of Search .................................. 280/433, 434, 280/435, 436, 437, 438.1, 439, 440, 441, 441.1, 432

[56] References Cited

U.S. PATENT DOCUMENTS

| | | | |
|---|---|---|---|
| 3,633,940 | 1/1972 | Sinnard | 280/432 |
| 3,924,909 | 12/1975 | Kent et al. | 280/433 |
| 4,300,785 | 11/1981 | Mettetal | 280/432 |
| 4,341,395 | 7/1982 | Miller et al. | 280/432 |
| 4,586,726 | 5/1986 | Capps | 280/432 |
| 4,775,165 | 10/1988 | Grovum | 280/432 |
| 5,165,714 | 11/1992 | Kaim | 280/433 |
| 5,257,796 | 11/1993 | Thorwall et al. | 280/434 |
| 5,368,324 | 11/1994 | Kaim | 280/438.1 |
| 5,529,329 | 6/1996 | McCoy | 280/438.1 |

*Primary Examiner*—Kevin Hurley
*Attorney, Agent, or Firm*—Edward J. Brosius; F. S. Gregorczyk; Stephen J. Manich

[57] ABSTRACT

A fifth wheel for trucks is disclosed. Such fifth wheels usually are mounted on truck tractors and receive kingpins that are mounted on truck trailers. An operating rod is provided to manually disengage the kingpin locking mechanism. In one embodiment the fifth wheel plate is mounted on bases with trunnion pins. The bases are secured to the truck tractor. Retaining pins are received in flanges and serve to block axial movement of the trunnion pins. The retaining pins are disposed parallel to the top surface of the plate and are perpendicular to the axes of the trunnion pins. The retaining pins and flanges may be spaced far enough below the fifth wheel support surface so that a misfed kingpin cannot contact them. Alternatively, or in addition, the retaining pins may be under a protector that extends over the length of the retaining pin to prevent a misfed kingpin from striking the retaining pins. In another embodiment the protector is sized and shaped to prevent a misfed kingpin from striking an extended operating rod of the fifth wheel assembly. The protector may be a convex shaped deflector that shifts the path of the misfed kingpin away from the operating arm, or may be shaped to catch the misfed kingpin. The same shape protector can serve both purposes of protecting the retaining pins and the operating arm. The outer edge of each protector is below the top surface of the fifth wheel plate.

43 Claims, 6 Drawing Sheets

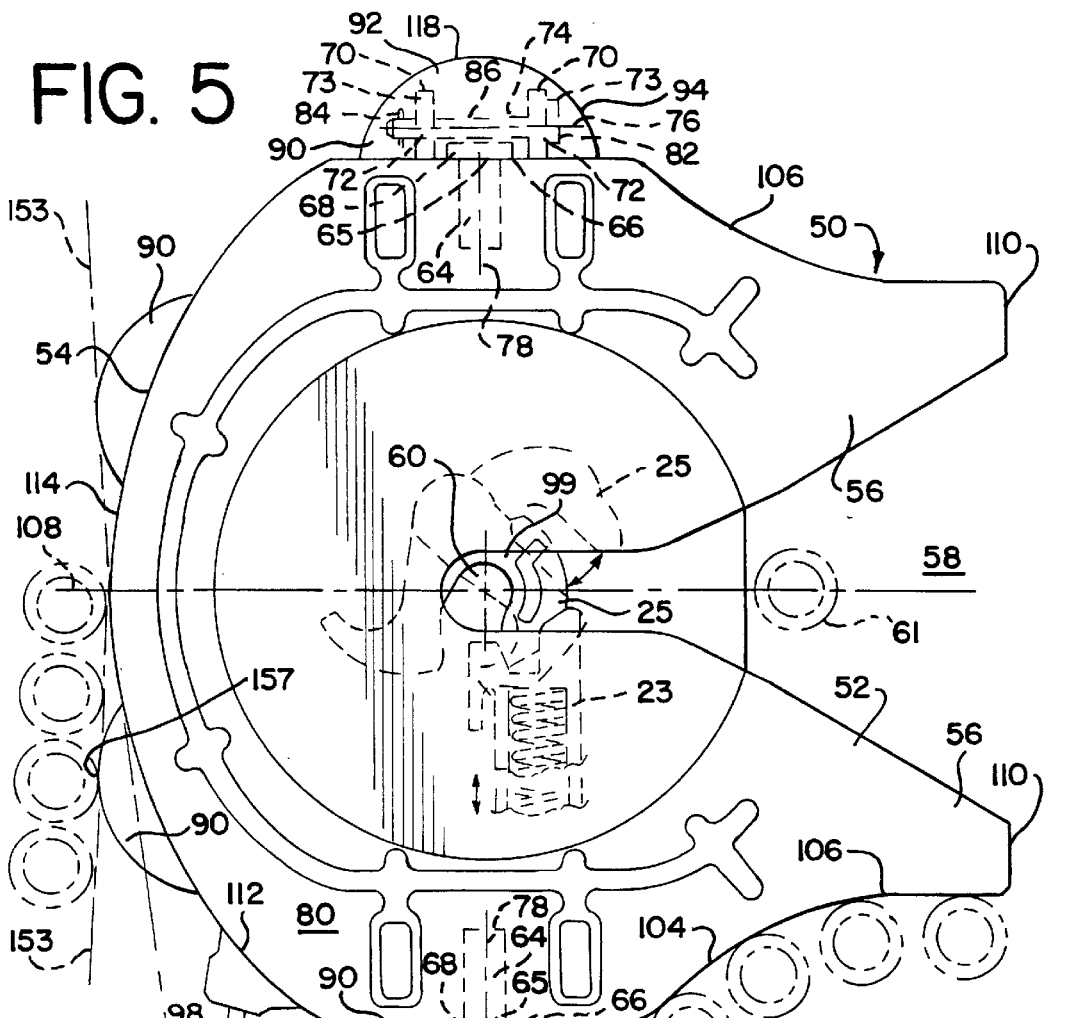
FIG. 5
FIG. 5A
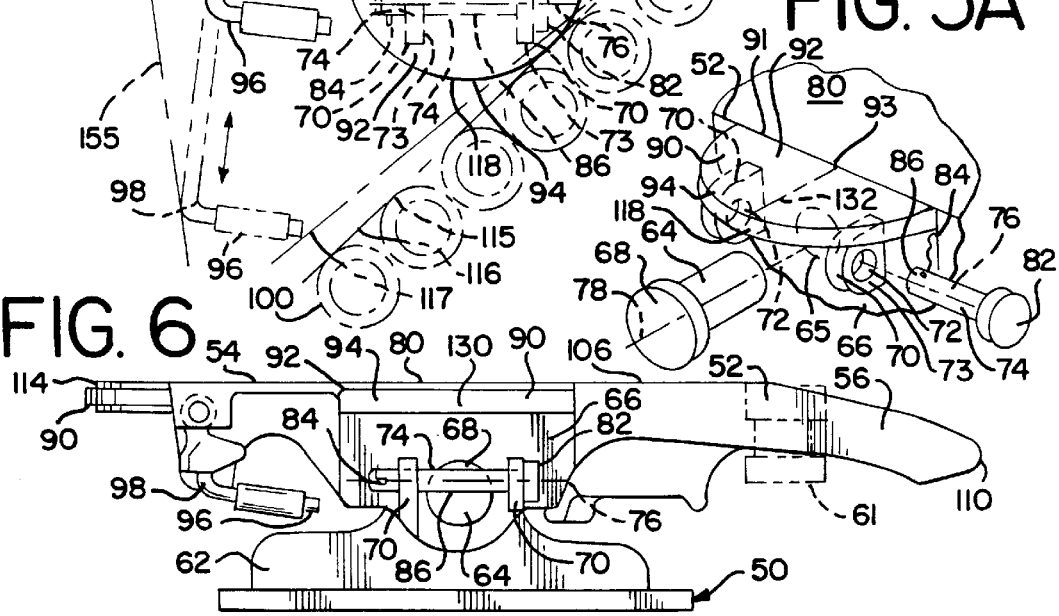
FIG. 6

5,941,549

FIFTH WHEEL KINGPIN DEFLECTOR AND CATCHER

FIELD OF THE INVENTION

The present invention relates to fifth wheels for trucks.

BACKGROUND OF THE INVENTION

Fifth wheels are used to connect truck tractors and trailers in a way that allows for relative movement between the truck tractor and trailer. Fifth wheels allow the truck tractors and trailers to pivot about a vertical axis when the vehicle combination is negotiating a curve or turn. They also allow for pivoting about a horizontal axis when the vehicle combination encounters rough or uneven terrain.

Fifth wheels are affixed to truck tractors and kingpins are affixed to the trailers. To connect a truck tractor and trailer, the driver backs the truck tractor under the trailer while guiding the kingpin into a gap in the fifth wheel. The driver backs the truck tractor until the kingpin reaches a blind throat or draft port at the end of the gap in the fifth wheel, where a locking mechanism locks onto the kingpin.

To accept the kingpin, the locking mechanism must first be released. To release the locking mechanism to accept the kingpin, the fifth wheel usually includes a manual operating rod. A typical operating rod has a free end accessible from outside the fifth wheel. The free end of an operating rod is usually pulled outwardly to release the locking mechanism to accept the kingpin. The operating rod free end may also be pulled to release the locking mechanism to free a locked kingpin from the locking mechanism.

The fifth wheel is usually mounted on a pair of bracket bases affixed to the truck tractor. Trunnion pins are usually used to secure this mounting. Typical trunnion pins have common horizontal axes so that the fifth wheel may pivot about the horizontal axes as the vehicle travels over uneven terrain. The fifth wheel may also pivot on the trunnion pins when coupling the truck tractor and trailer. While they may rotate and the fifth wheel plate may rotate on them, the trunnion pins must not move outwardly along their axes or the fifth wheel plate could become dislodged from the truck tractor. To retain the trunnion pins in position, a retainer device like a cotter pin, clinch pin, through bolt, or the like is typically used. Usually, retainers extend through diametric holes at the interior ends of the trunnion pins. To insert or remove the retainer, the installer must reach under the fifth wheel plate and work without easy access to the retainer or diametric hole.

When backing the truck tractor under the trailer, it sometimes happens that the driver misses the kingpin with the mouth or gap of the fifth wheel plate. In such a case, the misfed kingpin may travel around the outer edge of the fifth wheel plate. In traveling around the fifth wheel plate edge, the misfed kingpin may hit and damage the extended operating rod if the driver continues to back up. Or the misfed kingpin may travel over the top surface of the fifth wheel plate and slide over the front part of the edge of the fifth wheel plate. The driver may mistakenly believe that the misfed kingpin is in place and begin to pull forward; the misfed kingpin that slid over the front edge may travel around the outer edge of the fifth wheel plate. It may hit the extended operating rod, damaging it and requiring premature replacement of the operating rod, the operating mechanism components, or both.

The problem of a misfed kingpin may commonly arise in "yard spotting." In yard spotting, a driver moves trailers from place to place within a yard without raising the landing gear. The yard tractor usually has a fifth wheel mounted on a hydraulic boom. The frictional connection between the fifth wheel plate and trailer bed plate may give the driver the impression that the trailer and yard tractor are coupled when the kingpin has actually been misfed and misdirected. Such a situation could be dangerous if the trailer slips off the fifth wheel plate.

SUMMARY OF THE INVENTION

The present invention provides a structure that protects the operating rod from damaging contact with the kingpin. The protective structure may serve to deflect the path of travel of a misfed kingpin. It may also serve to catch a misfed kingpin. In either case the protective structure prevents the misfed kingpin from contacting the operating rod.

One embodiment of the present invention also provides a structure that retains the trunnion pins in position. The retainer is accessible from outside the fifth wheel plate. The trunnion pins and retainer structures may be below the level of the fifth wheel top bearing surface, and may be placed far enough below that bearing surface so that a misfed kingpin cannot contact them. Alternatively or in addition, the retainer may be protected from potential shear from an improperly positioned kingpin by a protective structure.

In one aspect, the present invention provides a fifth wheel assembly for coupling a truck tractor and trailer. The trailer has a kingpin to be received within a locking mechanism in the fifth wheel. The fifth wheel assembly is mounted on the truck tractor. The assembly comprises a fifth wheel plate having a trailer support surface for supporting a trailer bed plate. The fifth wheel plate has a pair of rearward projecting ramps separated by a kingpin-receiving gap. The kingpin-receiving gap has a blind port to receive the kingpin. The assembly also includes a locking mechanism to lock the kingpin in the blind port. The locking mechanism can also be moved to an unlocked or released position to free the kingpin. A pair of bracket bases are mounted to the truck tractor and have aligned openings. The bracket base openings and mating openings in the fifth wheel plate receive trunnion pins to secure the fifth wheel plate to the bracket bases. The trunnion pins have central longitudinal axes and are set laterally on the truck tractor so that the fifth wheel plate may pivot about the trunnion pin axes. The trunnion pins have enlarged heads outboard of the fifth wheel plate. A plurality of retention flanges extend outwardly from the fifth wheel plate. Retaining pins are supported by the retention flanges. Each retaining pin is associated with one trunnion pin and has an axis disposed generally perpendicular to the axis of the trunnion pin and each retaining pin is adjacent to the enlarged head of the trunnion pin; that is, the retaining pins' axes are longitudinally disposed when supported by the retention flanges and the trunnion pins' axes are laterally disposed when received in the fifth wheel plates and bracket bases. Thus, each retaining pin serves to limit lateral movement of the associated trunnion pin. The assembly may include a protector having a surface extending over the length of the retaining pin. Each protector has an edge positioned between each retaining pin and the trailer support surface of the fifth wheel plate.

In another aspect, the present invention provides a fifth wheel assembly for coupling a truck tractor and trailer. The trailer has a kingpin to be received within a locking mechanism in the fifth wheel. The fifth wheel assembly is mounted on the truck tractor. It comprises a fifth wheel plate having a trailer support surface for supporting a trailer bed plate.

The fifth wheel plate has a side edge around its perimeter and a pair of rearwardly-projecting ramps. The ramps are separated by a kingpin-receiving gap. The kingpin-receiving gap has a blind port to receive the kingpin. The assembly includes a locking mechanism to lock the kingpin in the port. The assembly also has an operating rod for manually disengaging the locking mechanism to free the kingpin. The operating rod is movable between extended and retracted positions and has a free end extending beyond the side edge of the fifth wheel plate when the operating rod is extended. This embodiment of the assembly also includes a protector. The protector has an edge beyond the edge of the fifth wheel plate. The protector edge is in a different plane than the plane of the fifth wheel plate's support surface. The protector edge is sized, shaped and positioned to prevent contact between the free end of the operating rod and a misfed kingpin.

In another aspect, the present invention also provides a fifth wheel assembly for coupling a truck tractor and trailer wherein the trailer has a kingpin to be received within a locking mechanism in the fifth wheel mounted on the truck tractor. The kingpin has a vertical length. The fifth wheel assembly comprises a fifth wheel plate having a trailer support surface for supporting a trailer bed plate and a pair of rearward projecting ramps separated by a kingpin-receiving gap. The kingpin-receiving gap has a blind port to receive the kingpin. The assembly also includes a locking mechanism to lock the kingpin in the port. There are a pair of bracket bases mounted to the truck tractor, the bases having aligned openings. Trunnion pins are received in the openings in the fifth wheel plate and bracket bases for securing the fifth wheel plate on the bracket bases. The trunnion pins have axes about which the fifth wheel plate may pivot and enlarged heads outboard of the fifth wheel plate. There are a plurality of retention flanges extending outwardly from the fifth wheel plate. Retaining pins are supported by the retention flanges. Each retaining pin is associated with one trunnion pin and has an axis disposed generally perpendicular to the axis of the adjacent trunnion pin. The retaining pin axes are generally parallel to the plane of the trailer support surface of the fifth wheel plate. Each retaining pin serves to limit movement of the associated trunnion pin. The retention flanges and retaining pins are between the level of the trailer support surface of the fifth wheel plate and the truck tractor. The retention flanges and retaining pins are spaced from the plane of the trailer support surface by a distance greater than the vertical length of the kingpin.

BRIEF DESCRIPTION OF THE DRAWINGS

FIG. 5 is a top plan view of one embodiment of a fifth wheel assembly of the present invention, and illustrating a path of travel for a misfed kingpin.

FIG. 5A is an exploded partial perspective view of the area of the flange and protector of the fifth wheel plate of FIG. 5.

FIG. 6 is a side elevation of the fifth wheel assembly of FIG. 5.

DETAILED DESCRIPTION

Figure 1:
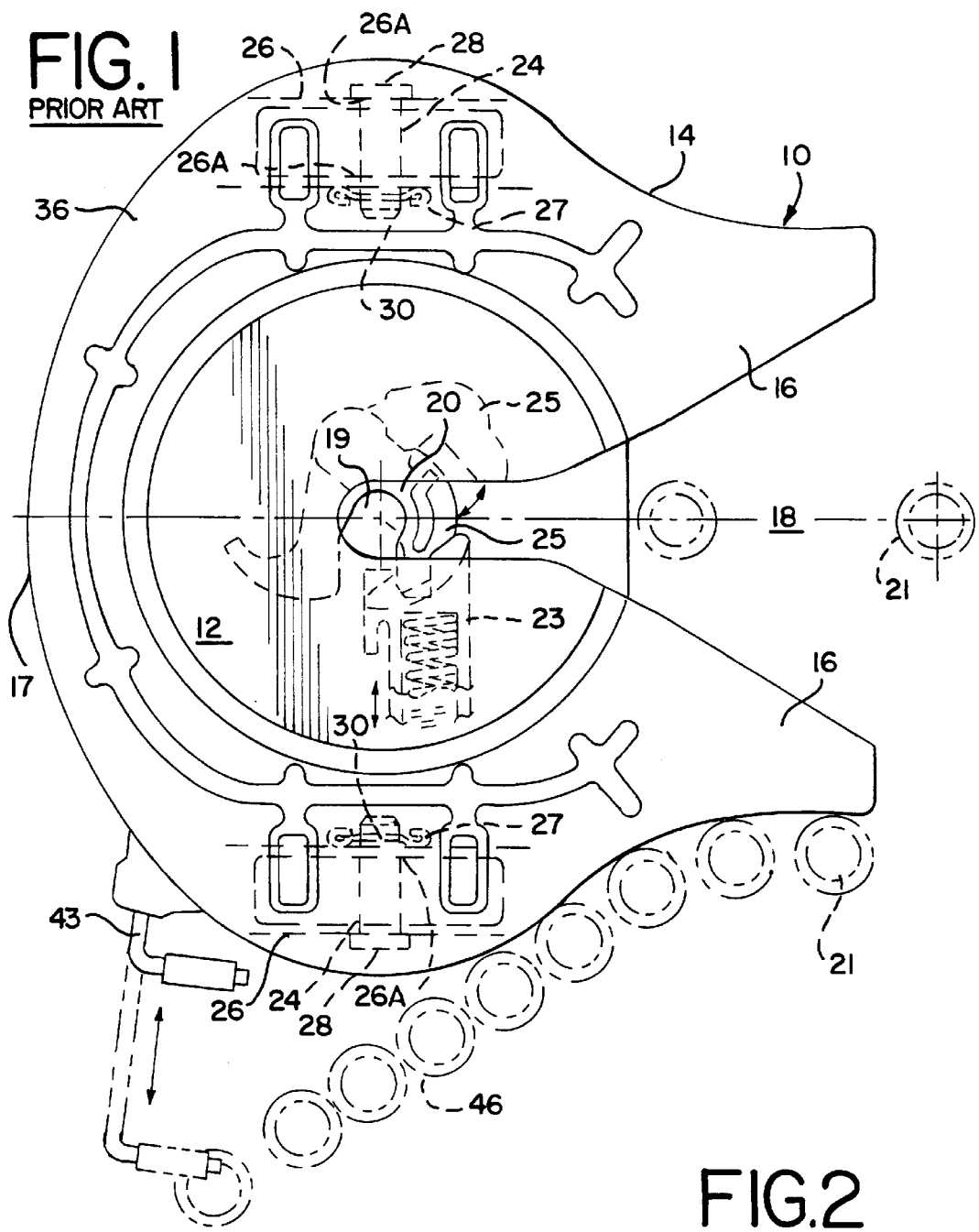
FIG. 1 is a top plan view of a prior art fifth wheel assembly.

Prior art fifth wheels are illustrated in the accompanying FIGS. 1–4. As there shown, each prior art fifth wheel assembly 10 includes a fifth wheel plate 12 having an edge 14 around its outer perimeter. The plate has two rearward ramps 16 at its rear edge opposite its front 17. The ramps straddle a kingpin-receiving mouth or V-shaped gap 18. The V-shaped gap or mouth 18 converges to a blind draft port 19 at the center of the plate 12. Beneath the port 19 the prior art fifth wheel assembly includes a locking mechanism 20 for locking a kingpin 21 in position in the port 19. The fifth wheel plate assembly is mounted so that the front 17 is nearest the cab of the truck tractor. The ramps 16 face the rear.

Figure 2:
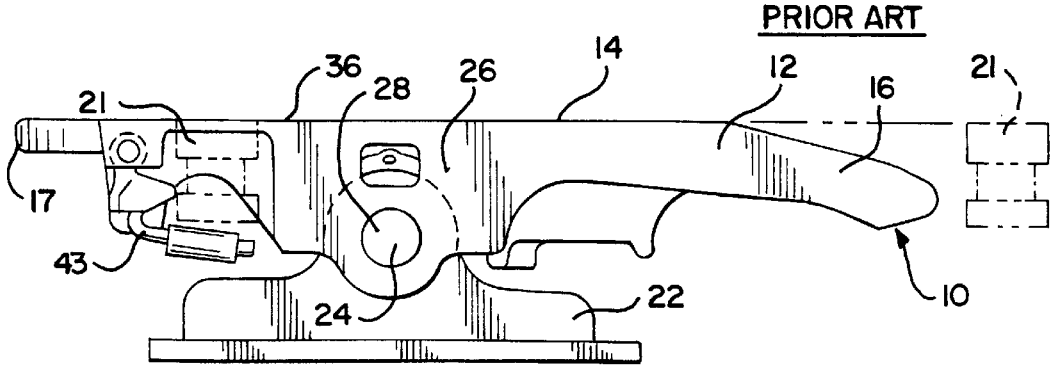
FIG. 2 is a side elevation of the prior art fifth wheel assembly of FIG. 1.

Each prior art fifth wheel plate 12 is pivotally mounted on a pair of bracket bases 22 and secured through trunnion pins 24. The trunnion pins fit through holes 26A in flanges or side walls 26 of the fifth wheel plate 12. The flanges define bracket heads pockets. The trunnion pins fit through mating holes in the bracket bases 22. Each trunnion pin 24 has an enlarged head 28 that bears against the exterior of the side walls 26 to limit the extent of the pin's inward movement. To limit the trunnion pins' 24 outward movement, the prior art has used devices such as cotter pins or clinch pins 27. Such pins fit through the holes in the interior ends 30 of the trunnion pins 24, as shown in the embodiment of FIGS. 1–2. In the second illustrated prior art embodiment, shown in FIGS. 3–4, outward movement of the trunnion pin 24 is limited by a retaining bolt 32 that blocks the enlarged head 28 of the trunnion pin from the exterior. As illustrated, the prior art retaining bolt 32 has a vertical central axis 34, perpendicular to both the trunnion pin axis 35 and to the plane of the fifth wheel plate 12 upper or top support surface 36. The retaining bolt 32 fits through a hole in a flange 38 extending from the side wall 26 of the fifth wheel plate. It has an enlarged head 40 resting on the top side of the flange 38. A flanged lock nut 42, cotter pin or the like may be applied to the retaining bolt below the flange 38. As shown, the enlarged head 40 of the retaining bolt 32 of the second illustrated prior art embodiment is exposed and unprotected: it can be struck and sheared off or damaged if the fifth wheel gap 18 and the kingpin 21 have missed during coupling, that is, if during coupling the kingpin is traveling outside of the fifth wheel gap 18.

Such prior art fifth wheel plates usually include operating rods 43. The operating rods may be used to manually unlock or release the locking mechanism that holds the kingpin in place in the throat of the fifth wheel. Usually, to unlock the locking mechanism 20, the operating rod 43 is pulled out from its normal retracted position to the extended position shown in phantom lines in FIG. 1. As the operating rod 43 is extended, the end of the operating rod beneath the fifth wheel pulls on a lever bar (not shown) that pulls back on a lock 23, freeing the rotatable jaw 25. With the jaw 25 freed from the lock 23, the kingpin may open the jaw, as shown in phantom lines in FIG. 1, and exit the locking mechanism during uncoupling. The open jaw 25 holds the lock 23 in the retracted position until a properly-fed kingpin is received in the port 19, and activates the locking mechanism 20 by causing the jaw 25 of the locking mechanism to encircle and lock around the kingpin, freeing the lock 23. A spring forces the lock 23 toward the port, pushing the lever bar, which in turn causes the operating rod to retract to the position shown in solid lines in FIG. 1. But if the kingpin is not fed into the mouth or gap 18 of the fifth wheel plate, its path of travel 46 becomes misdirected. The misdirected path is outside the mouth or gap 18 of either prior art embodiment, as shown in phantom in FIGS. 1 and 3. The misfed kingpin 21 could strike and damage the extended operating rod 43. Such damage could require replacement of the operating rod, operating mechanism components, or both.

The present invention addresses the need to protect the operating rod during the coupling operation. It also addresses the need for an exterior structure that will retain the trunnion pins in place while being protected from possible damage from a misfed kingpin.

As shown in FIG. 5, the present invention provides a fifth wheel assembly 50 having a fifth wheel plate 52 with an edge 54 around its perimeter. The plate 52 has a pair of rearward sloped ramps 56 separated by a V-shaped gap 58 that defines a kingpin-receiving mouth. The V-shaped gap 58 ends in a blind draft port 60 that receives a kingpin 61. The kingpin is locked in place by a locking mechanism 99. The fifth wheel plate 52 is mounted on a pair of bracket bases 62 and secured with trunnion pins 64. As shown in FIGS. 5 and 5A, the illustrated trunnion pins 64 extend through holes in opposed side walls or flanges 66. The flanges 66 extend downwardly from opposite positions on the fifth wheel plate 52. The trunnion pins 64 also extend through mating holes in the bracket bases 62. Each trunnion pin has a central longitudinal axis 78; when the trunnion pin is inserted through the mating holes, its central longitudinal axis 78 is disposed laterally on the truck tractor. The fifth wheel plate may pivot about the laterally-disposed central longitudinal axes 78 of the trunnion pins. The trunnion pins 64 have enlarged heads 68 on the exterior of the side walls 66 to limit inward lateral movement of the trunnion pins 64.

To limit outward movement of the trunnion pins 64, the illustrated embodiment provides a pair of retention flanges 70 for each trunnion pin. The retention flanges 70 extend outwardly from each of the side walls 66. The retention flanges 70 have holes 72 aligned along a horizontal axis to receive retaining pins 74 through the holes 72. Thus, the retaining pins 74 are supported by the retention flanges 70. The retention flange holes 72 are in surfaces 73 that extend out from the side walls 66 perpendicular to the side walls and perpendicular to the plane of the upper or top trailer support surface 80 of the fifth wheel plate 52. When received in or through the retention flange holes 72, the retaining pins 74 have central longitudinal axes 76 that are longitudinally-disposed to be perpendicular to the laterally-disposed central longitudinal axes 78 of the trunnion pins 64. The longitudinally-disposed retaining pins' central longitudinal axes 76 are also parallel with the plane of the upper or top trailer support surface 80 of the fifth wheel plate 52. Since the retention flanges 70 are on the fifth wheel side walls, the mounted retaining pins rotate with rotation of the fifth wheel plate. The retaining pins 74 have enlarged heads 82 that prevent the pins from slipping through the openings or holes 72 in the retention flanges 70. The retaining pins 74 may have diametrical holes on the opposite ends to receive cotter or clinch pins 84 or the like to keep the retaining pins in position. The shank 86 of each retaining pin crosses the enlarged head 68 of each trunnion pin to limit or prevent outward longitudinal movement of the trunnion pin 64 out of its receiving hole 65 in the side walls 66. With the clinch pins 84 removed, the retaining pins 74 may be removed by sliding the shank out through the holes in the retention flanges, enabling removal of the trunnion pins. And since the retaining pins 74 and cotter or clinch pins 84 are on the exterior of the fifth wheel plate, installation and removal of these parts are facilitated.

To protect the retaining pin 74 and trunnion pin 64 from damage from contact with a misfed kingpin, the positions of the retention flanges 70 and retaining pins 74 are below the level of the bottom of the misfed kingpin 61, as shown in FIG. 6. The distance between the plane of the top trailer support surface 80 and the retention flanges 70 and retaining pins 74 is greater than the length of the kingpin. Alternatively, or in addition, a protector 90 may be positioned above the retention flanges 70 and below the level of the plane of the upper or top trailer support surface 80 of the fifth wheel plate 52.

The protector 90 of the first embodiment is a deflector comprising an ear extending out from the side wall 66 of the fifth wheel plate. The deflector serves to deflect the path of a misfed kingpin 61 away from the extended operating rod. The first illustrated protector 90 has a planar top or upper surface 92 spaced at about one-quarter of an inch below the plane of the upper or top trailer support surface 80 of the fifth wheel plate; preferably, the protector top surface 92 is positioned so that it does not contact or bear against the trailer when coupled. The protector 90 also has an outer edge 94 vertically positioned between the retaining pin 74 and the plane of the fifth wheel plate upper trailer support surface 80.

In embodiments employing a protector and retention flanges 70 positioned so that contact is possible between a misfed kingpin and the retention flanges 70 or retaining pin 74, the protector 90 may be sized, shaped and positioned to prevent a kingpin from contacting the retaining pin by blocking or overlying the entire length of the retaining pin 74, including both the shank 86 and enlarged head 82. The illustrated protector 90 is also sized, shaped and positioned so that if a kingpin is misfed during coupling, the relative motion between the misfed kingpin and the fifth wheel assembly sets a course of travel that prevents contact between the misfed kingpin and the free end 96 of the operating rod 98, that is, the protector deflects a misfed kingpin away from the extended operating rod, to protect the entire exposed length of the extended operating rod from contact with a misfed kingpin.

As illustrated, typical operating rods 98 extend outward from beneath the fifth wheel plate 52 to free ends 96 exposed outside the fifth wheel plates during coupling of the truck tractor and trailer. These operating rods allow for manual release or unlocking of the locking mechanism 99 of the fifth wheel assembly during uncoupling. Before coupling, the free end 96 of the operating rod 98 is typically outward and one part of the locking mechanism 99 has pulled away from another, opening a path from the port 60 to the open end of the gap 58 to receive the kingpin, as shown in phantom in FIG. 1. As shown in FIGS. 5, 7, 9 and 11, when extended, the free end 96 of the operating rod 98 could extend 10–13 inches out from the edge 54 of the fifth wheel plate 52. When the fifth wheel locks the kingpin in place, a substantial length of the operating rod automatically retracts into the interior of the fifth wheel assembly. In the retracted position, only a few inches of the operating rod are exposed. The angular relationship of the operating rod and fifth wheel plate also changes as the operating rod is reciprocated between the extended and retracted positions; generally, in the illustrated embodiment the free end 96 of the operating rod 98 is closer to the plane of the fifth wheel plate top surface 80 when retracted or locked than when extended. The operating rod has a third or lockset position wherein the free end 96 is closer to the plane of the fifth wheel plate top surface 80. To uncouple the kingpin and fifth wheel assembly, the driver may pull the free end 96 to disengage the locking mechanism 99.

Figure 3:
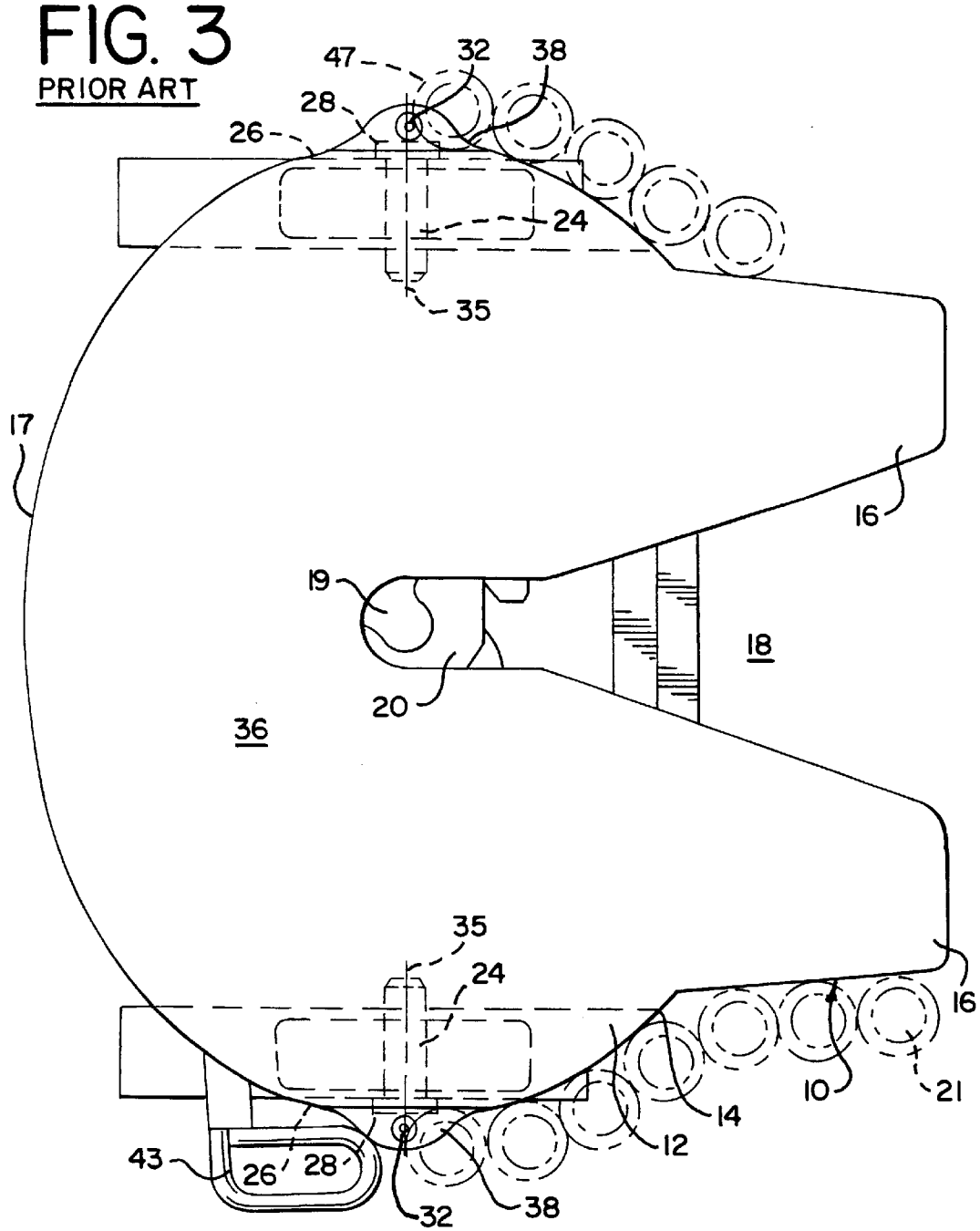
FIG. 3 is a top plan view of another prior art fifth wheel assembly.
Figure 4:
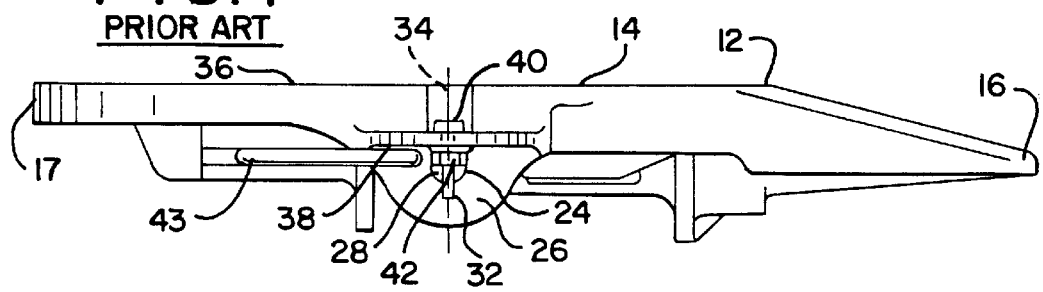
FIG. 4 is a side elevation of the prior art fifth wheel assembly of FIG. 3.

Thus, a substantial length of the extended operating rod may be exposed to contact with the kingpin during coupling if the gap and kingpin miss each other. A possible course of travel 46 for a misfed kingpin is illustrated in phantom in the prior art FIG. 1 embodiment, showing possible contact with the exposed length of the extended operating rod. Such contact could damage the operating rod or the operating mechanism or both. The present invention changes the course of travel of the misfed kingpin to prevent such contact and any such resulting damage. Another possible course of travel 47 for a misfed kingpin is illustrated in phantom in the prior art embodiment of FIG. 3, showing possible contact and damage to the enlarged head 40 of the retaining bolt 32. The present invention positions its retaining pin and flanges either below the bottom of a misfed kingpin, or protects the retaining pin and flanges with an overlying protector to prevent such contact and such damage.

It should be understood that in typical settings, during coupling the trailer is supported on its landing gear, and the trailer and kingpin are thus immobilized. The fifth wheel assembly, mounted on the truck tractor, generally moves with respect to the kingpin to feed the kingpin into the throat of the fifth wheel assembly. But if the kingpin is misfed, the fifth wheel assembly pushes the misfed kingpin in the improper paths or courses of travel 46 as the truck tractor backs up. However, if the kingpin is misfed there could also or alternatively be some movement or diverting of the truck tractor from its original path relative to the kingpin. References to path or course of travel are intended to include relative movement between the kingpin and truck tractor, whatever apparatus is moving. And as used herein, reference to a misfed kingpin is to one that is outside the mouth or gap 18, 58 and port 19, 60 of the fifth wheel plate 12, 52 and beyond the entrance to the gap during coupling of the truck tractor and trailer. A misfed kingpin may travel along the edge 14, 54 of the fifth wheel plate from the ramp 16, 56 toward the front 17, 114. A misfed kingpin may travel over the upper support surface 36, 80 of the fifth wheel plate and along the edge of the fifth wheel plate down the front 17, 114 of the fifth wheel plate near the truck tractor cab.

In the first embodiment shown in FIGS. 5–6, the protector 90 may comprise a semi-elliptical ear extending outwardly from the fifth wheel side walls 66. In that embodiment, the protector 90 is a convex deflector. It has a length of about 8.0 inches along its major axis 91 and a width of about 1.88 inches along its minor axis 93, its outermost point 118 being along its minor axis 93. The illustrated semi-elliptical deflector is shaped to deflect the path of the misfed kingpin away from the exposed length of the extended operating rod 98. It should be understood that this shape and these dimensions are given for purposes of illustration only; other shapes and dimensions may be used and the preferred dimensions will depend upon the particular environment. A suitable deflector ear may alternatively comprise a semi-circle shaped edge with a planar top surface, either spaced below and parallel to the support surface 80 of the fifth wheel plate or angled downwardly from it. In addition, a plane 116 tangent with both the protector edge 94 and the divergent part 104 of the side edge 54 of the fifth wheel plate 52 does not intersect the operating rod. Instead, the tangent plane 116 is spaced from the entire length of the operating rod 98 and defines a deflected or diverted path of travel 115 of the misfed kingpin 61. The edge 94 of the protector 90 extends beyond a plane 117 defined by the free end 96 of the extended operating rod 98 and the side edge 54 of the fifth wheel plate. In addition, the first illustrated deflector overlies the entire length of the retaining pin 74 to prevent contact between the misfed kingpin and the retaining pin 74, illustrating the use of such a protector where contact would otherwise be possible between the misfed kingpin and retaining pin and retention flanges.

Figure 7:
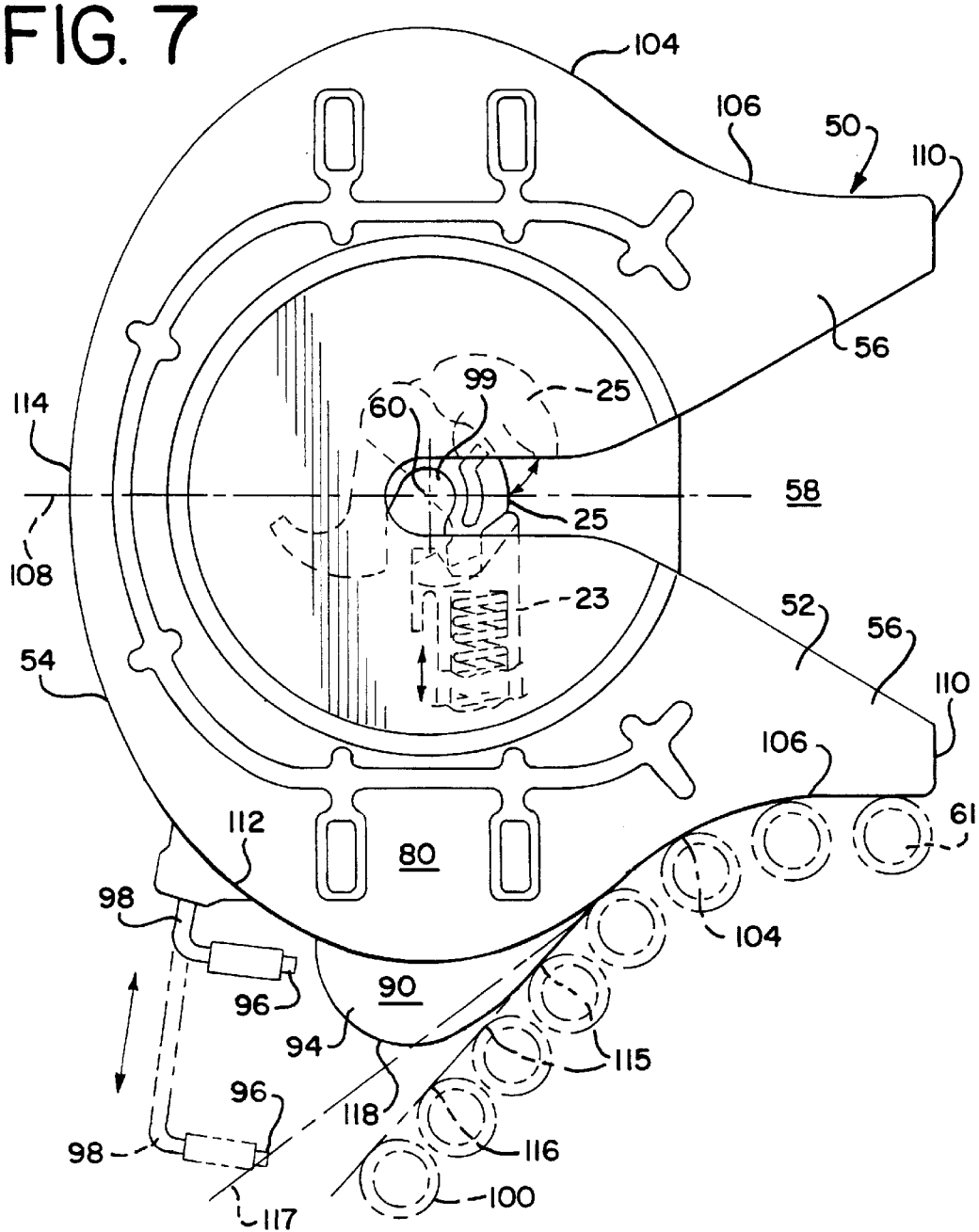
FIG. 7 is a top plan view of another embodiment of a fifth wheel assembly of the present invention.
Figure 8:
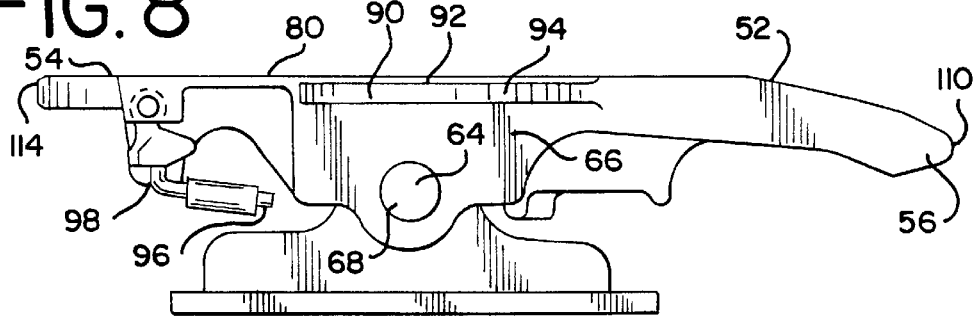
FIG. 8 is a side elevation of the fifth wheel assembly of FIG. 7.

To deflect the path of travel of a misfed kingpin, the second illustrated protector edge 94 shown in FIGS. 7–8 continues the line of the divergent part 104 of the side portion 106 of the fifth wheel plate edge 54. It continues to diverge away from the median centerline 108 of the fifth wheel plate 52. As shown, the side portions 106 of the edge 54 of the fifth wheel plate 52 start at the back edges 110 at the ramps 56. From the back edges 110, the side portions 106 curve away from the median centerline 108 of the fifth wheel plate at the divergent parts 104. From the divergent parts 104, the side portions 106 curve back toward the median centerline 108 at convergent parts 112. The convergent parts 112 meet at the front portion 114 of the edge 54. In the first illustrated embodiment, a plane 116 may be drawn tangent to both the protector edge 94 and divergent part 104 of the side portion 106 of the fifth wheel plate edge 54. The plane 116 does not intersect the operating rod in its extended, retracted or lockset position; this plane 116 defines a possible diverted path of travel 100 for a misfed kingpin 61, a path of travel that prevents contact between the kingpin 61 and the operating rod 98. The protector 90 may be sized and positioned to overlie the entire length of the retaining pin 74, to prevent contact between the misfed kingpin and the enlarged head 82 and shank 86 of the retaining pin 74 if the vertical distance between the head 82 and support surface 80 of the fifth wheel is less than the length of the kingpin. In the illustrated embodiment, the outermost point 118 on the edge 94 of the protector is about 1.88 inches from the side edge 54 of the fifth wheel plate, and lies in a plane about 13.5 inches from the front-most part of the edge.

It is not necessary that the protector extend from the side wall of the fifth wheel plate. The protector may, for example, bend downwardly away from the top support surface 80 of the fifth wheel plate toward the trunnion pin. In such a case, the outermost point 118 on the protector's edge 94 is between the top support surface 80 of the fifth wheel plate and the retaining pin 64. The top surface 92 of the protector 90 lies in a plane that intersects the plane of the top support surface 80 of the fifth wheel plate. This embodiment is shown in FIGS. 11–12.

Generally, it is desirable that the protector 90 top surface 92 lie in a different plane that the top trailer support surface 80 of the fifth wheel plate, so that when a trailer bed plate (not shown) is in position, there is no contact between the trailer bed plate and the protector. Typically, a pattern will have been worn in the trailer bed plate by prior fifth wheel plates; a change in the area of contact between the fifth wheel and trailer bed plate could increase friction and change the feel of the ride to the driver.

Figure 11:
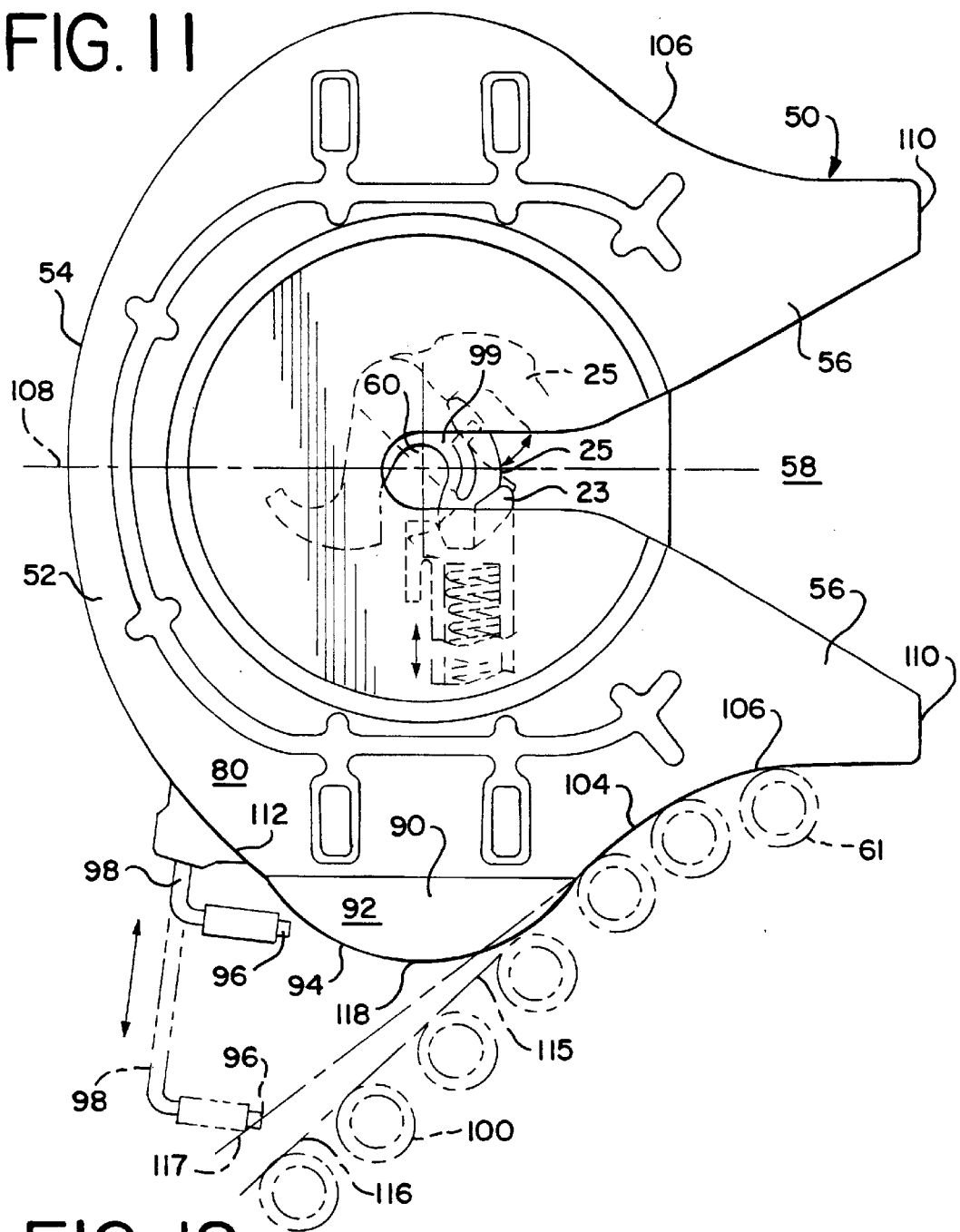
FIG. 11 is a top plan view of another embodiment of the fifth wheel assembly of the present invention.
Figure 12:
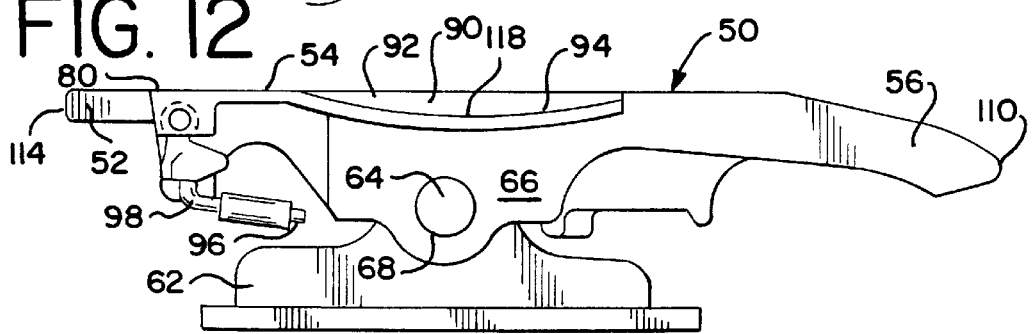
FIG. 12 is a side elevation of the fifth wheel assembly of FIG. 11.

For the deflector type of protector, it is preferred that the deflector be shaped to divert the path of the misfed kingpin 61 away from the edge 54 of the fifth wheel plate 52, as shown at 115 in FIGS. 5, 7 and 11. Preferably, the deflector edge 94 does not act like a cam to be followed completely by the misfed kingpin. The protector edge 94 may be made to extend further beyond the plane 117 tangent to the free end 96 of the operating rod 98 and the divergent part 104 of the side edge 54 to allow a greater margin of error if the kingpin does follow part of the edge of the protector.

Figure 9:
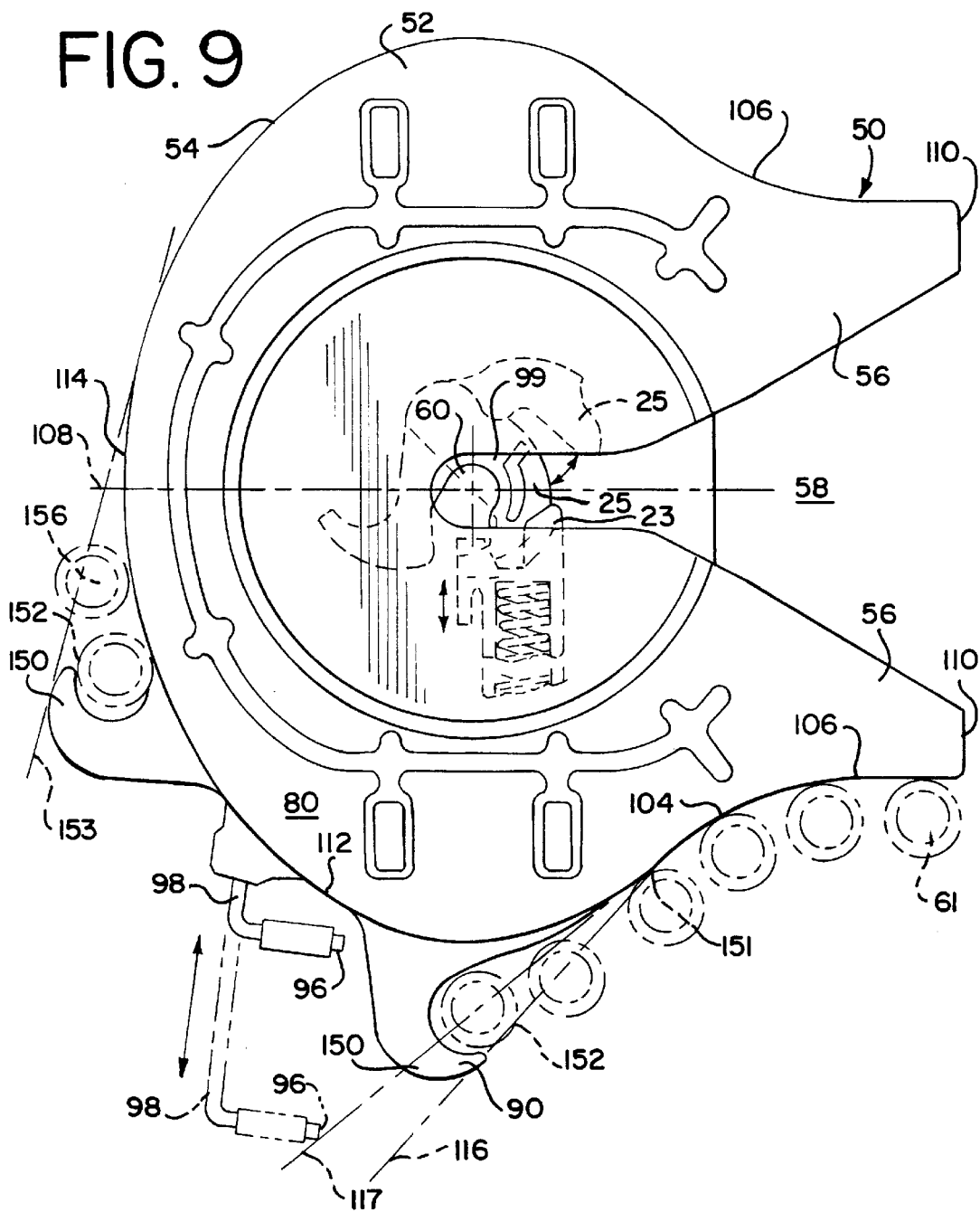
FIG. 9 is a top plan view of another embodiment of a fifth wheel assembly of the present invention.
Figure 10:
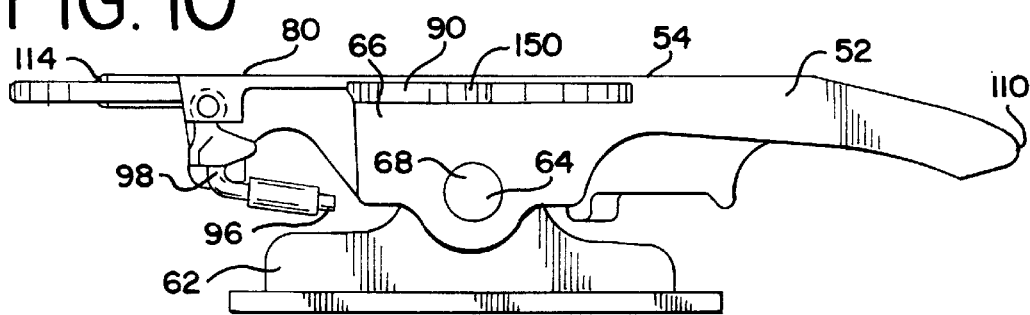
FIG. 10 is a side elevation of the fifth wheel assembly of FIG. 9.

As another alternative to the convex deflector of FIGS. 5–8 and 11–12, it may be desirable for the protector 90 to comprise a catcher 150 as shown in the embodiment of FIGS. 9–10. As there shown, the kingpin catcher 150 may comprise a hook element. The hook opening 152 may be directed toward the back edge 110 of the fifth wheel plate at the ramps 56. The opening 152 is large enough to catch and receive a misfed kingpin to prevent the misfed kingpin from contacting the operating rod 98. In this embodiment the path of travel 151 of the misfed kingpin is into the opening 152 of the hook element 150. In the illustrated embodiment the hook extends outwardly to a degree that a plane 116 tangent to the hook and to the side edge of the fifth wheel plate is spaced from the free end 96 of the extended operating rod 98 and does not intersect the operating rod. The hook extends beyond a plane 117 tangent to the free end 96 of the operating rod 98 and the divergent part 104 of the side edge 54. It should be understood that the hook may extend farther around than shown in FIG. 9.

As shown in FIG. 5, there may be two protectors 90 provided on the fifth wheel plate, one above each retaining pin 74. The two protectors need not be similarly shaped; since the operating rod 98 is only on one side of the fifth wheel plate, only one protector needs to be shaped to protect the operating rod from contact; the other protector may be shaped to protect the retaining pin. The protectors could alternatively be shaped merely to protect the retaining pins and not the operating rod.

It has also been known that some drivers have put the kingpins on the upper trailer support surface 36, 80 of the fifth wheel plate and pushed the kingpin beyond the front periphery or front portion 17, 114 of the edge of the fifth wheel plate. When the driver then pulls forward, the kingpin comes down around the edge of the fifth wheel plate from the top, damaging the operating rod. To prevent this type of damage, a protector 90 may be provided along the front portion 114 of the fifth wheel plate edge as shown in FIGS. 5, 6, 9 and 10. Two protectors may be provided on both sides of the median centerline 108 of the fifth wheel plate, as shown in the embodiment of FIG. 5. The protectors may be of the convex type shown in FIGS. 5–8 or the hook type shown in FIGS. 9–10. Alternatively, one of each could be used. In the embodiments using a catcher or hook 150 type protector, the hook opening 152 may be directed toward the median centerline 108 of the fifth wheel plate, with the misfed kingpin 61 following a course of travel 156 into the opening 152 of the hook. The protector on the front portion 114 may be combined with convex or catcher type protectors overlying the retaining pins. As with the side convex protectors shown in FIGS. 5–8 and 11–12, a plane 153 tangent to the edge of the top deflectors and hooks and to the adjacent top portion of the side edge of the fifth wheel plate may be spaced from the free end of the extended operating rod; for the convex deflector type protector, this tangent plane 153 defines a deflected path of travel 157 for the misfed kingpin 61. As shown in FIG. 5, the edge 94 of the protector 90 extends beyond a plane 155 tangent to the free end 96 of the extended operating rod 98 and the front portion 114 of the edge of the fifth wheel plate. It may be desirable to extend the top protector laterally toward the operating rod and farther outward to provide greater protection when the driver pulls forward since the kingpin will be moving both rearward and to the side as the driver pulls forward.

It may also be desirable to dispose the protector on another part of the fifth wheel assembly 50 or truck tractor, such as welding or casting a protector as part of the bracket base 62. Such a protector could be used to deflect the path of travel of the kingpin away from the operating rod. A protector on the bracket base 62 could be combined with another structure to protect the retaining pin 74.

The present invention may be made by casting the protective deflector or catcher as part of the fifth wheel plate. Alternatively, the protective deflector or catcher can be cast or machined as part of the bracket base. A protective deflector or catcher may also be cast as a separate element and then welded or bolted to the fifth wheel or bracket base.

The present invention may be used as described, by including it as part of the fifth wheel assembly mounted on the truck tractor and then coupling the truck tractor and trailer as done in the past. And while the protector of the present invention may be used with the retention flanges and retaining pins of the present invention, it should be understood that any of the various embodiments of the protector may be used with other trunnion retaining structures, including the prior art structure shown in FIG. 1, and that the illustrated retention flanges and retaining pins may be used with or without a protector; if the retention flanges and retaining pins are placed low enough so that a misfed kingpin cannot contact them, then a protector would not be necessary for protection of the flanges and retaining pins; a protector may still be desirable in such cases to protect the operating rod but need not be placed over the retaining pins, and a single protector could be used.

While only specific embodiments of the invention have been described and shown, it is apparent that various additions and modifications can be made thereto. It is, therefore, the intention in the appended claims to cover all such additions and modifications as may fall within the true scope of the invention.

I claim:

1. A fifth wheel assembly for coupling a truck tractor and trailer wherein the trailer has a kingpin to be received within a locking mechanism in the fifth wheel mounted on the truck tractor, the fifth wheel assembly comprising:

a fifth wheel plate having a trailer support surface for supporting a trailer bed plate, the fifth wheel plate having a pair of rearward projecting ramps separated by a kingpin-receiving gap, the kingpin-receiving gap having a blind port to receive the kingpin;

a locking mechanism to lock the kingpin in the port;

a pair of bracket bases mounted to the truck tractor and having aligned openings;

trunnion pins received in the openings in the fifth wheel plate and bracket bases for securing the fifth wheel plate on the bracket bases, the trunnion pins having axes about which the fifth wheel plate may pivot and enlarged heads outboard of the fifth wheel plate;

a plurality of retention flanges extending outwardly from the fifth wheel plate;

retaining pins supported by the retention flanges, each retaining pin being associated with one trunnion pin and having an axis generally perpendicular to the axis of the trunnion pin and generally parallel to the plane of the trailer support surface of the fifth wheel plate, each retaining pin serving to limit movement of the associated trunnion pin; and a protector having a surface extending over the length of each retaining pin, each protector having an edge positioned between each retaining pin and the trailer support surface of the fifth wheel plate.

2. The fifth wheel assembly of claim 1 wherein the protector is sized, shaped and positioned to prevent contact between the retaining pin and a misfed kingpin on a path of travel outside of the mouth of the fifth wheel plate.

3. The fifth wheel assembly of claim 1 wherein the fifth wheel has an edge around its perimeter and further including an operating rod for manually disengaging the locking mechanism to free the kingpin, the operating rod being movable between extended and retracted positions, the operating rod having a free end extending beyond the edge of the fifth wheel plate when the operating rod is in the extended position, the protector comprising a deflector sized, shaped and positioned to deflect the path of a misfed kingpin away from the extended operating rod when the misfed kingpin is moving relative to the fifth wheel assembly.

4. The fifth wheel assembly of claim 1 wherein the protector comprises a deflector having a surface lying in a plane different from the plane of the trailer support surface of the fifth wheel plate, the deflector surface overlying the retention flange and retaining pin below the trailer support surface of the fifth wheel plate.

5. The fifth wheel assembly of claim 4 wherein the deflector edge is semi-elliptical in shape.

6. The fifth wheel assembly of claim 1 wherein the protector comprises a surface defining an angle with the trailer support surface of the fifth wheel plate.

7. The fifth wheel assembly of claim 1 wherein the protector edge defines a guide for guiding relative movement of a misfed kingpin and fifth wheel plate.

8. The fifth wheel assembly of claim 7 wherein the fifth wheel includes an operating rod for disengaging the locking mechanism to free the kingpin, the operating rod having a free end extending beyond the perimeter of the fifth wheel plate, the protector being positioned between one of the ramps and the free end of the operating rod and shaped to prevent a misfed kingpin from contacting the operating rod.

9. The fifth wheel assembly of claim 3 wherein the protector edge extends beyond a plane tangent to the free end of the extended operating rod and to the side edge of the fifth wheel plate.

10. The fifth wheel assembly of claim 3 wherein the protector edge and fifth wheel plate edge are sized, shaped and positioned with respect to each other so that a plane tangent to both the protector edge and the fifth wheel plate edge is spaced from the free end of the extended operating rod.

11. The fifth wheel assembly of claim 1 wherein the protector comprises a hook for catching the kingpin.

12. The fifth wheel assembly of claim 1 wherein the fifth wheel plate has an edge having a front portion opposite the ramps and side portions between the front portion and the ramps, the fifth wheel assembly including an operating rod movable between extended and retracted positions, the operating rod having a free end extending beyond one side portion of the fifth wheel plate edge when the operating rod is in the extended position, the protector being positioned along the side wall between the operating rod and the ramp.

13. The fifth wheel assembly of claim 1 wherein the fifth wheel plate has an edge having a front portion opposite the ramps and side portions between the front portion and the ramps, the fifth wheel assembly including an operating rod movable between extended and retracted positions, the operating rod having a free end extending beyond one side portion of the fifth wheel plate edge when the operating rod is in the extended position, the fifth wheel assembly further including a protector positioned on the front portion of the fifth wheel plate edge.

14. The fifth wheel assembly of claim 12 wherein the protector and fifth wheel plate edge are sized, shaped and positioned with respect to each other so that a plane tangent to both the protector edge and fifth wheel plate edge is spaced from the operating rod.

15. The fifth wheel assembly of claim 13 wherein each protector and fifth wheel plate edge are sized, shaped and positioned with respect to each other so that a plane tangent to each protector edge and nearest fifth wheel plate edge is spaced from the operating rod.

16. The fifth wheel assembly of claim 12 wherein the protector edge extends beyond a plane tangent to both the free end of the extended operating rod and the fifth wheel plate side edge.

17. The fifth wheel assembly of claim 13 wherein the protector edge extends beyond a plane tangent to both the free end of the extended operating rod and the fifth wheel plate side edge.

18. A fifth wheel assembly for coupling a truck tractor and trailer wherein the trailer has a kingpin to be received within a locking mechanism in the fifth wheel mounted on the truck tractor, the fifth wheel assembly comprising:

a fifth wheel plate having a trailer support surface for supporting a trailer bed plate, a pair of rearwardly-projecting ramps separated by a kingpin-receiving gap having a blind port to receive the kingpin, the fifth wheel plate further including a side edge around the perimeter of the fifth wheel plate;

a locking mechanism to lock the kingpin in the port;

an operating rod for manually disengaging the locking mechanism to free the kingpin, the operating rod being movable between extended and retracted positions and having a free end extending beyond the side edge of the fifth wheel plate when the operating rod is in the extended position;

a protector having an edge beyond the edge of the fifth wheel plate and in a different plane that the plane of the fifth wheel plate support surface, the protector edge being sized, shaped and positioned to prevent contact between the extended operating rod and a misfed kingpin having a path of travel contacting the protector edge;

wherein the fifth wheel plate edge includes a front portion opposite the gap opening and two side portions between the front portion and the ramps, the extended operating rod extending past one of the side portions, the entire protector edge being positioned along one of the side portions between the operating rod and the ramp nearest the operating rod.

19. The fifth wheel assembly of claim 18 wherein the protector is hook shaped to catch the misfed kingpin, the hook opening toward the ramps.

20. The fifth wheel assembly of claim 18 wherein the protector comprises a convex shape extending outwardly from the side wall of the fifth wheel plate to deflect the path of a misfed kingpin.

21. The fifth wheel assembly of claim 18 wherein the side portion of the fifth wheel plate edge has a divergent part that diverges smoothly from the rearward ramp portion and a convergent part that converges from the divergent part toward the front portion, the protector edge continuing the line of the divergent part of the side portion of the edge to a furthermost point and then sharply curving back toward the convergent part of the side portion of the fifth wheel plate edge.

22. The fifth wheel assembly of claim 18 wherein the fifth wheel plate includes a side wall extending down from the side edge and wherein the protector extends outwardly from the side wall of the fifth wheel plate, the protector edge curving away from the edge of the fifth wheel plate edge.

23. The fifth wheel assembly of claim 18 wherein the protector has a semi-elliptical shape.

24. The fifth wheel assembly of claim 18 wherein there are a plurality of protectors spaced around the edge of the fifth wheel plate.

25. The fifth wheel assembly of claim 18 wherein the protector is integral with the fifth wheel.

26. The fifth wheel assembly of claim 18 wherein a plane tangent with the edge of the protector and the edge of the fifth wheel plate is spaced from the operating rod.

27. The fifth wheel assembly of claim 18 wherein the protector edge extends beyond a plane tangent to the free end of the extended operating rod and the side edge of the fifth wheel plate.

28. A fifth wheel assembly for coupling a truck tractor and trailer wherein the trailer has a kingpin to be received within a locking mechanism in the fifth wheel mounted on the truck tractor, the fifth wheel assembly comprising:

a fifth wheel plate having a trailer support surface for supporting a trailer bed plate, a pair of rearwardly-projecting ramps separated by a kingpin-receiving gap having a blind port to receive the kingpin, the port having a closed end, the fifth wheel plate further including a side edge around the perimeter of the fifth wheel plate;

the fifth wheel side edge including a front portion opposite the gap opening and two side portions between the front portion and the ramps;

a side wall extending down from the front and side portions of the side edge of the fifth wheel and having spaced trunnion pin holes to receive trunnion pins for mounting the fifth wheel plate on a truck tractor, the side wall having a bottom opposite the side edge of the fifth wheel;

a locking mechanism to lock the kingpin in the port;

an operating rod for manually disengaging the locking mechanism to free the kingpin, the operating rod being movable between extended and retracted positions and having a free end extending beyond the side edge of the fifth wheel plate when the operating rod is in the extended position;

a protector having an edge beyond the edge of the fifth wheel plate and in a different plane that the plane of the fifth wheel plate support surface, the protector edge being sized, shaped and positioned to prevent contact between the extended operating rod and a misfed kingpin having a path of travel contacting the protector edge;

the greatest radial distance between the closed end of the port and the edge of the protector being less than the greatest radial distance between the closed end of the port and the free end of the operating rod when the operating rod is extended; and wherein at least part of the side wall of the fifth wheel spaced from the gap opening and between the trunnion pin holes is exposed from the side edge down to the bottom of the side wall.

29. A fifth wheel assembly for coupling a truck tractor and trailer wherein the trailer has a kingpin to be received within a locking mechanism in the fifth wheel mounted on the truck tractor, the fifth wheel assembly comprising:

a fifth wheel plate having a trailer support surface for supporting a trailer bed plate, a pair of rearwardly-projecting ramps separated by a kingpin-receiving gap having a blind port to receive the kingpin, the port having a closed end, the fifth wheel plate further including a side edge around the perimeter of the fifth wheel plate;

a locking mechanism to lock the kingpin in the port;

an operating rod for manually disengaging the locking mechanism to free the kingpin, the operating rod being movable between extended and retracted positions and having a free end extending beyond the side edge of the fifth wheel plate when the operating rod is in the extended position;

a protector having an edge beyond the edge of the fifth wheel plate and in a different plane that the plane of the fifth wheel plate support surface, the protector edge being sized, shaped and positioned to prevent contact between the extended operating rod and a misfed kingpin having a path of travel contacting the protector edge;

the greatest radial distance between the closed end of the port and the edge of the protector being less than the greatest radial distance between the closed end of the port and the free end of the operating rod when the operating rod is extended; and wherein the protector is spaced from a volume above the entire part of the operating rod that is beyond the side edge of the fifth wheel so that the operating rod is accessible without substantial interference from the protector when the operating rod is in the retracted position and when the operating rod is in the extended position.

30. A fifth wheel assembly for coupling a truck tractor and trailer wherein the trailer has a kingpin to be received within a locking mechanism in the fifth wheel mounted on the truck tractor, the fifth wheel assembly comprising:

a fifth wheel plate having a trailer support surface for supporting a trailer bed plate, a pair of rearwardly-projecting ramps separated by a kingpin-receiving gap having a blind port to receive the kingpin, the fifth wheel plate further including a side edge around the perimeter of the fifth wheel plate;

a locking mechanism to lock the kingpin in the port;

an operating rod for manually disengaging the locking mechanism to free the kingpin, the operating rod being movable between extended and retracted positions and having a free end extending beyond the side edge of the fifth wheel plate when the operating rod is in the extended position;

a protector having an edge beyond the edge of the fifth wheel plate and in a different plane that the plane of the fifth wheel plate support surface, the protector edge being sized, shaped and positioned to prevent contact between the extended operating rod and a misfed kingpin having a path of travel contacting the protector edge;

wherein the protector comprises a hook shape with an opening sized and shaped to catch and capture a misfed kingpin.

31. The fifth wheel assembly of claim 30 wherein the opening of the protector hook faces toward the ramp end of the fifth wheel plate.

32. The fifth wheel assembly of claim 30 wherein the opening of the protector hook faces the centerline of the fifth wheel plate and is positioned to capture a kingpin moving down from the front edge of the fifth wheel plate.

33. The fifth wheel assembly of claim 30 wherein there are a plurality of hook shaped protectors, wherein the openings of two hook shaped protectors face the centerline of the fifth wheel plate and each other, and another hook shaped protector wherein the opening faces the ramp end of the fifth wheel plate.

34. A fifth wheel assembly for coupling a truck tractor and trailer wherein the trailer has a kingpin to be received within a locking mechanism in the fifth wheel mounted on the truck tractor, the kingpin having a vertical length, the fifth wheel assembly comprising:

a fifth wheel plate having a trailer support surface for supporting a trailer bed plate, the fifth wheel plate having a pair of rearward projecting ramps separated by a kingpin-receiving gap, the kingpin-receiving gap having a blind port to receive the kingpin;

a locking mechanism to lock the kingpin in the port;

a pair of bracket bases mounted to the truck tractor and having aligned openings;

trunnion pins received in the openings in the fifth wheel plate and bracket bases for securing the fifth wheel plate on the bracket bases, the trunnion pins having axes about which the fifth wheel plate may pivot and enlarged heads outboard of the fifth wheel plate;

a plurality of retention flanges extending outwardly from the fifth wheel plate;

retaining pins supported by the retention flanges, each retaining pin associated with one trunnion pin and having an axis disposed generally perpendicular to the axis of the trunnion pin and generally parallel to the plane of the trailer support surface of the fifth wheel plate, each retaining pin limiting movement of the associated trunnion pin;

the retention flanges and retaining pins being between the level of the trailer support surface of the fifth wheel plate and the truck tractor, the retention flanges and retaining pins being spaced from the plane of the trailer support surface by a distance greater than the vertical length of the kingpin.

35. The fifth wheel assembly of claim 34 further comprising a protector having a surface extending over the length of the retaining pin, each protector having an edge positioned between each retaining pin and the trailer support surface of the fifth wheel plate.

36. The fifth wheel assembly of claim 34 wherein the fifth wheel has an edge around its perimeter and further including an operating rod for manually disengaging the locking mechanism to free the kingpin, the operating rod being movable between extended and retracted positions, the operating rod having a free end extending beyond the edge of the fifth wheel plate when the operating rod is in the extended position, the fifth wheel assembly further including a protector sized, shaped and positioned to deflect the path of a misfed kingpin away from the extended operating rod when the misfed kingpin is moving relative to the fifth wheel assembly.

37. The fifth wheel assembly of claim 36 wherein the protector has an edge extending beyond a plane tangent to the free end of the extended operating rod and to the side edge of the fifth wheel plate.

38. The fifth wheel assembly of claim 36 wherein the protector has an edge and the protector edge and fifth wheel plate edge are sized, shaped and positioned with respect to each other so that a plane tangent to both the deflector edge and the fifth wheel plate edge is spaced from the free end of the extended operating rod.

39. The fifth wheel assembly of claim 34 further comprising a hook for catching a misfed kingpin.

40. The fifth wheel assembly of claim 39 wherein the hook is positioned along the side wall between the operating rod and the ramp.

41. The fifth wheel assembly of claim 39 wherein the hook is positioned on the front portion of the fifth wheel plate edge.

42. The fifth wheel assembly of claim 36 wherein the protector is positioned along the side wall between the operating rod and the ramp.

43. The fifth wheel assembly of claim 36 wherein the protector is positioned on the front portion of the fifth wheel plate edge.

* * * * *